Patented Aug. 11, 1931

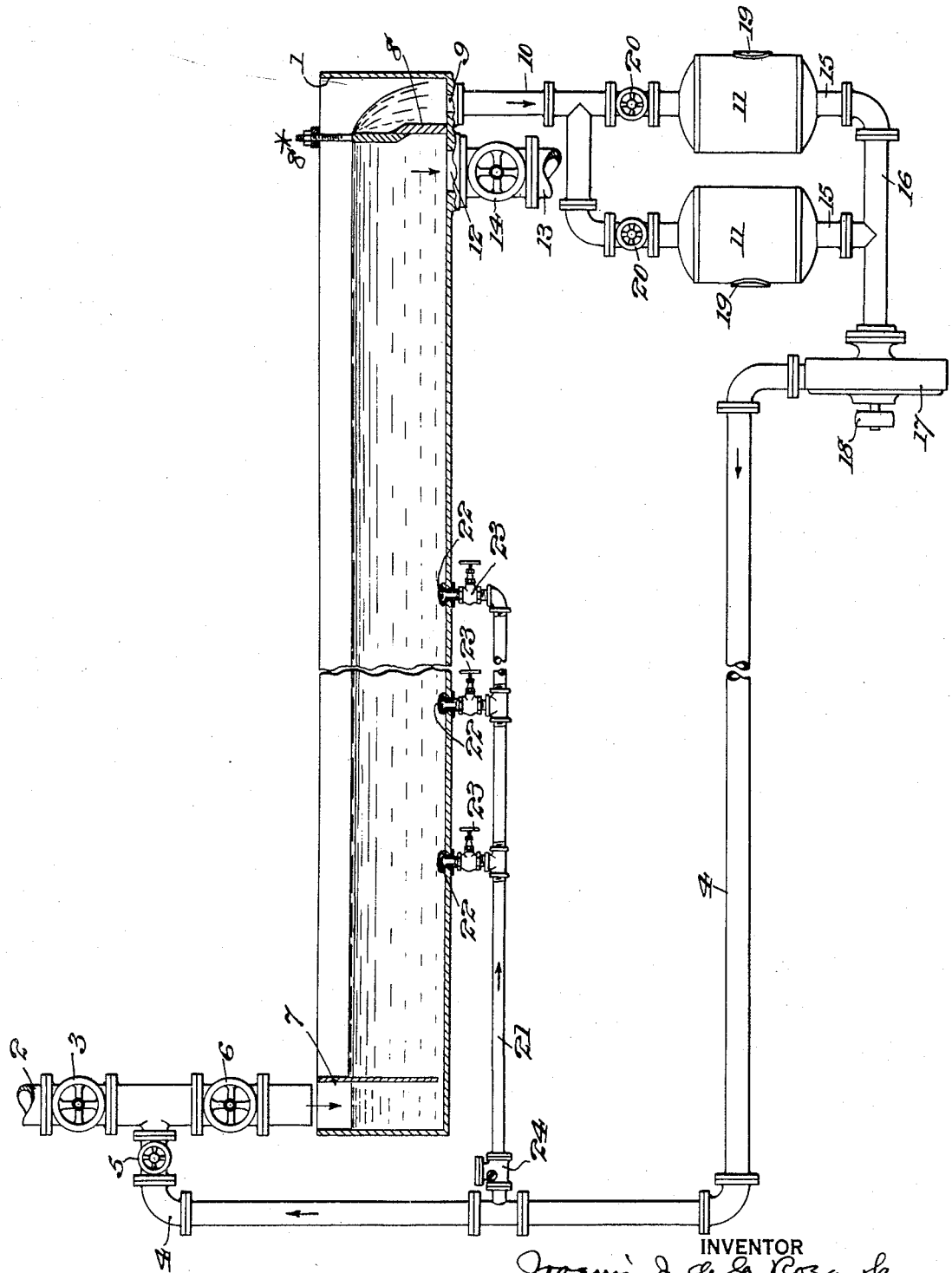

1,817,973

UNITED STATES PATENT OFFICE

JOAQUIN JULIO DE LA ROZA, SR., OF TUINUCU, CUBA

APPARATUS FOR REMOVING CARBON AND THE LIKE FROM CELLULOSE

Application filed October 9, 1929. Serial No. 398,385.

This invention relates to a method of and apparatus for removing carbon and the like from cellulose.

It has for an object to provide a method whereby carbon and the like may be separated from the cellulose while the latter is in mixture with water.

Another object consists in providing such a method in which the separation takes place during flow of the cellulose and water mixture.

Another object consists in providing such a method in which the mixture of cellulose and water, containing the carbon and the like, is treated during a flowing movement so that the carbon and the like is separated and flows away from the mixture of cellulose and water.

Another object consists in providing such a method in which the carbon and the like is separated without the necessity of mechanical agitation.

Another object consists in providing apparatus which is suitable for conducting the said method.

Another object consists in providing certain improvements in the form, construction and arrangement of the apparatus, and in the steps of the method; whereby the above named and other objects may effectively be attained.

A practical embodiment of apparatus for conducting the method is shown in the accompanying drawing in a detail side elevation, partly in section.

In the manufacture of cellulose from vegetable material, such as wood, sugar cane, corn stalks, straws, spart-grass, bamboo, and other suitable plants, there has been encountered an almost insurmountable complication due to the presence of carbon and carbonaceous materials in the cellulose which are exceedingly difficult to separate therefrom. Such carbon and the like is frequently present due to fires that have partially burned the material and, in the cases where wood has been employed, it has been the custom to cut away parts including the burned portions before treatment, because the practical impossibility of removing the carbon has been recognized. This cutting away engenders expense in labor and economic loss of material, and such procedure is not, of course, feasible in connection with the canes and grasses. It is well known that fires are frequent in the sugar cane fields, so that my process is particularly applicable in connection with the manufacture of cellulose from sugar cane fiber.

Again, there is a constant need for re-using cellulose materials such, for instance, as news print, but the fact that the latter is impregnated with ink that contains carbon has presented, in its case, an almost insurmountable obstacle to repulping and employment for again producing the same quality of paper.

Attempts to separate carbon and the like from cellulose by riffling or by centrifugal action, or other known procedures depending upon differences in specific gravity, have been unsuccessful, probably because the carbon and the like differs so slightly in this respect from the cellulose.

My method and apparatus provide means for thoroughly and economically separating the carbon and the like from the cellulose material, so as to eliminate the above named disadvantages and substantially improve the quality of the cellulose product.

According to my method, the cellulose containing the carbon and the like is mixed with a large proportion of water and a small proportion of a hydro-carbon liquid such, for instance, as kerosene or coal oil, and the mixture of these three elements is permitted to flow slowly through a duct or channel provided at its outlet end with a skimming weir or dam and with an outlet opening near the bottom. During the slow flow of the mixture, the oil rises to the top because of its lower specific gravity and carries with it the carbon and the like to form a scum on the surface of the mixture. Simultaneously, the cellulose tends to settle to the bottom of the duct. At the outlet end of the duct or channel, this scum passes over the top of the weir or dam and thence to a strainer or filter in which the carbon and the like is separated from the oil so that the latter may be reused. Also at the outlet end of the duct or channel is located a port in the bottom thereof through which the cellulose and water, freed from the carbon and the like, is passed to the subsequent step in the cellulose manufacturing procedure. If desired, additional supplies of the oil may be injected into the mixture during its flow so as to separate particles of carbon and the like which may have been entangled with the cellulose and dragged down, instead of rising with the original amount of oil associated in the mixture.

The phenomenon which causes the oil to seize the carbon and the like and carry the same upwardly with it is not certainly known to me, but it may be due to a preferential action of the oil toward the carbon or to a relation between surface tension and colloidal characteristics of these substances, or to some other cause or causes. However, it appears clear that the oil will be absorbed by the carbon and the like, rather than by the wet cellulose; and it is certain that the result which I have described takes place because I have empirically demonstrated the same.

Referring to the accompanying drawing, the duct or channel through which the mixture is intended slowly to flow is denoted by 1, and it may be composed of any suitable material and be of such length and width as mill convenience, efficiency, and surrounding conditions dictate. As an example, a length of about fifty feet and a width of two or three feet is suggested. The said duct is preferably open at the top as indicated.

The inlet or feed pipe for the mixture of cellulose and water is denoted by 2 and it may be provided with a suitable hand valve 3 for regulating the flow.

An inlet pipe for the oil is marked 4 and it also may have a flow regulating hand valve 5. The said pipe 4 enters pipe 2 and the latter debouches into one end of the duct 1, as clearly shown in the drawing. A hand valve 6 formed in pipe 2 near duct 1 serves to regulate the flow of the complete mixture of cellulose, water and oil.

A partition 7 is formed in the duct 1 adjacent the point where the mixture enters the latter, and the said partition is spaced from the bottom of the duct, whereby the mixture is compelled to pass to the bottom of the duct before proceeding to flow along it.

Adjacent the other end of the duct is a skimming weir or dam 8 which is here shown as composed of two parts, the upper part of which has a screw threaded rod and nut engagement with a cross bar on the duct 1, denoted generally as 8*. The nut on the threaded rod may be manipulated to raise and lower the upper part, as desired. This weir provides for skimming off the scum of oil and carbonaceous material, which then drops through a hole 9 in the bottom of the duct and passes through pipe 10 into twin strainers or filters 11, for the purpose of separating the oil and carbonaceous material.

On the opposite side of the weir 8, but adjacent thereto, a port 12 is formed in the bottom of duct 1 and communicates with pipe 13 that is calculated to lead the cellulose and water, freed of the carbon and the like, to the next step of the procedure followed in the manufacture of the cellulose product. A hand valve 14 is located in this pipe 13 for customary use.

The twin strainers or filters 11 have pipes 15 extending from the lower portions thereof into a common pipe 16 that leads to a pump 17, which may be driven by a motor or belt connected with its pulley 18. These pipes and pumps are for the purpose of re-using the oil from which the carbonaceous material has been separated in the strainers, and the former is forced by the pump 17 into the pipe 4 to be mixed with the incoming water and cellulose in pipe 2, as hereinabove described.

The strainers or filters 11 are provided with cleaning doors 19, and I prefer to use a twin type of strainer so that one may be cleaned while the other is functioning, thereby permitting continuous operation of the apparatus. To this end, valves 20 are provided for shutting off either of the strainers from the flow of oil and carbonaceous material. It will be understood that these strainers are of well known and approved design and that other suitable apparatus for performing their function is also known and could be substituted therefor.

The apparatus may also include a branch pipe 21, which leads from oil pipe 4 and carries a series of spray nozzles 22 that are fixed against leakage in holes formed in the bottom of duct 1. Valves 23 serve for shutting off any or all of the said nozzles as may be desired, and a check valve 24 set in the pipe 21 prevents backflow of the mixture in the duct in case the pressure in oil pipe 4 is interrupted. These spray nozzles 22 serve to provide additional supplies of oil which will pick up any entrapped carbonaceous material that has been carried down to the bottom of the duct by the cellulose.

In view of the preceding description of the method, the operation of the apparatus just set forth will be clear, so that it need not separately be recited.

The fluidity of the mixture may be varied to suit certain conditions as may be the proportion or percentage of oil. I have found it satisfactory to use about three or four per cent. of kerosene or coal oil to water, and to have about one-fourth to one-half of one per cent. solids to liquids in the complete mixture of cellulose, water and oil. A greater proportion of oil may be used without decreasing the efficiency of the process, but it is less economical and increases the fire hazard. Under certain circumstances, it may be found that more than four per cent. of oil is necessary completely to separate the carbonaceous material, and the skilled operator can readily determine this.

It will be understood that various changes may be resorted to in the form, construction and arrangement of the apparatus, and in the steps of the method and materials employed, without departing from the spirit and scope of my invention; and hence I do not intend to be limited to the details herein shown and described, except as they may be included in the claims. It may pecifically be noted that, instead of using a duct or channel, the separation might take place in decanters, settling tanks, centrifugal equipment, and the like; and that other hydro-carbons or their equivalents, such as xylene, tuoline, benzine, naphthalene, and many other distillates having a specific gravity different from water, might be substituted for the kerosene.

What I claim is:

1. Apparatus for the purpose described comprising, a duct, means for supplying the mixture of cellulose, water and liquid lighter than water to one part of the duct, and means at another part of the duct for separately drawing off the said liquid with carbon and the like and the water with cellulose freed from carbon and the like.

2. Apparatus for the purpose described comprising, a duct, means for supplying the mixture of cellulose, water and liquid lighter than water at one part of the duct, means at another part of the duct for separately drawing off the said liquid with carbon and the like and the water with cellulose freed from carbon and the like, and means for supplying additional quantities of said liquid at a point intermediate said parts of the duct.

3. Apparatus for the purpose described comprising, a duct, means for supplying the mixture of cellulose, water and liquid lighter than water to one part of the duct, means at another part of the duct for separately drawing off the said liquid with carbon and the like and the water with cellulose freed from carbon and the like, and means for supplying additional quantities of said liquid at a plurality of points intermediate said parts of the duct.

4. Apparatus for the purpose described comprising, a duct, means for supplying the mixture of cellulose, water and liquid lighter than water to one part of the duct, means at another part of the duct for separately drawing off the said liquid with carbon and the like and the water with cellulose freed from carbon and the like, and means for separating the carbon and the like from the said drawn off liquid and for returning the said liquid to the means for supplying the mixture to the duct.

5. Apparatus for the purpose described comprising, a duct, means for supplying the mixture of cellulose, water and liquid lighter than water to one part of the duct, means at another part of the duct for separately drawing off the said liquid with carbon and the like and the water with cellulose freed from carbon and the like, means for supplying additional quantities of said liquid at a point intermediate said parts of the duct, and means for separating the carbon and the like from the said drawn off liquid and for returning the said liquid to the means for supplying the mixture to the duct.

6. Apparatus for the purpose described comprising, a duct, means for supplying the mixture of cellulose, water and liquid lighter than water to one part of the duct, means at another part of the duct for separately drawing off the said liquid with carbon and the like and the water with cellulose freed from carbon and the like, means for supplying additional quantities of said liquid at a plurality of points intermediate said parts of the duct, and means for separating the carbon and the like from the said drawn off liquid and for returning the said liquid to the means for supplying the mixture to the duct.

In testimony, that I claim the foregoing as my invention, I have signed my name this 7th day of October, 1929.

JOAQUIN JULIO DE LA ROZA, SR.